(12) United States Patent
Stimpson

(10) Patent No.: X6717
(45) Date of Patent: Aug. 23, 1831

(54) RAIL-ROAD, &C., TURN ABOUT FOR

(76) Inventor: James Stimpson

James Stimpson, Baltimore Md.

Letters Patent.

The Schedule referred to in these Letters Patent & making
part of the same, containing a description in the words of the said
James Stimpson himself of his improvement in the construction of
wheels for rail road carriages.

To all whom these presents shall come; Be it known that
I, James Stimpson, of the City & County of Baltimore, & State of Maryland
have invented a new & useful improvement in the construction or
form of Road or Track wheels, intended for the use of Rail Road
Carriages of every description whatever, and that the following is a full
and exact description of the construction of the said wheels, as invented
or improved by me, viz. I propose to add to the common wheel as
now used a ring rim, or felloe (or whatever it may be proper to
call it) to the inside or inner periphery of the wheels, of the same thick
ness as the rim or periphery of the wheel at the outer edge where
it joins to said wheel, more or less, extending in from the rim
or inner periphery of the wheel towards the have, one to three inches
more or less, as may be desired; which ring, rim, or fellow, should
be on the outer edge, and opposite side of the wheel to that of the flange
which flange guides the wheels upon the track rails, and from
its necessary thickness & width, makes that edge of the rim or
periphery of the wheel; much the strongest, although much less
exposed to blows or to being broken than the outer edge of the
wheel, which runs upon the rail as the last mentioned edge
of the wheel, is liable to pass over all the obstructions, or im-
pediments that may be accidentally or designedly left upon
the rails; this inner ring rim, felloe or flange, should be just
flush with the outer edge or side of the rim of the wheel, its
whole thickness extending in with its inside joining
[illegible] it all being cast solid at the same time with the wheel. The whole object of the ring or felloe being to obtain the greatest strength possible with the least weight of metal, and I have no doubt fifteen pounds of iron thus disposed will afford as much protection to the wheel against breaking from severe percussi-ons upon the road, as one hundred pounds equally distributed throughout the whole of the rim. What I claim as my invention or improvement, is the application of the rim ring or felloe inside the tread, or rim, or inner periphery of the wheel or opposite to the flange as set forth in the above specification Witnesses
Geo. Neilson
William A Stimpson James Stimpson

53315

E.C
C.J.M.

(Drawing)

James Stimpson
Letters Patent

The Schedule referred to in these Letters Patent and making part of the same containing a description in the words of the said James Stimpson himself of his improvement in the mode of turning short curves on Rail Roads for which Letters Patent were granted dated the twenty third day of August 1831. which Letters Patent being hereby cancelled on account of a defective specification . -

---

{ Extended for seven years from 25th August 1845. }

To all whom these presents shall come. Be it known that I James Stimpson of the city and County of Baltimore and State of Maryland have invented a new and useful improvement in the mode of turning short curves upon rail roads with rail road carriages particularly those round the corners of Streets wharves &c and that the following is a full and exact description of said invention or improvement as invented or improved by me. Viz. I use or apply the common peripheries of the flanches of the flanches of the wheels for the aforesaid purpose in the following manner. I lay a flat rail (which however may be grooved if preferred at the commencement of the curvature and in a position to be centrally under the flanches of the wheels upon the outer track of the circle so that no other part of the wheels which run upon the outer circle of the track rails shall touch or bear upon the rails but the peripheries of the flanches they bearing the whole weight of the load and carriage while the opposite wheels which run upon the inner track of the circle are to be run and bear upon their treads in the usual way and their flanches run freely in a groove or channel, which treads are ordinarily about three inches in diameter less than the peripheries of the flanches. Were the bearing surfaces of the wheels which are in contact with the rails while thus turning the curve to be connected by straight lines from every point there would thus be formed the frustums of two cones (if there be four wheels and two axles to the carriage) or if but one axle and two wheels then but one cone, which frustums; or the wheels representing their extremities will if the wheels are thirty inches in diameter and are coupled about three feet six inches apart turn a curve of about sixty feet radius of the inner track rail. The difference in diameter between the flanches and treads before stated, the tracks of the usual width and the wheels coupled

[illegible] [illegible] back of [illegible] 1841 coupled as stated would turn a curve of a somewhat smaller radius if the axles
were not confined to the carriage in a parallel position with each other but this
being generally deemed necessary the wheels run upon lines of tangents and those
upon the inner track being as wide apart in the coupling as the outer ones
keep constantly inclining the carriage outwards and thus cause the carriage
to tend to run upon a larger circle than the difference in diameter of the
treads and flanches would otherwise give but the depth of the flanches and the coup-
lings may be so varied as to turn any other radius of a circle desired. What
I claim as my invention or improvement is the application of the flanch-
es of the wheels on one side of rail road carriages and of the treads of the wheels
on the other side, to turn curves upon rail ways particularly such as turn-
ing the corners of the streets, wharves &c in cities and elsewhere operating up-
on the principle herein set forth Witness
James H. Stimpson
Geo. C. Penniman James Stimpson Exd.
N.G.

(Drawing)

United States Patent
Patent No.: X6717
6717X
J. Stimpson,
Towing Vessels
Patented Aug. 23. 1831.
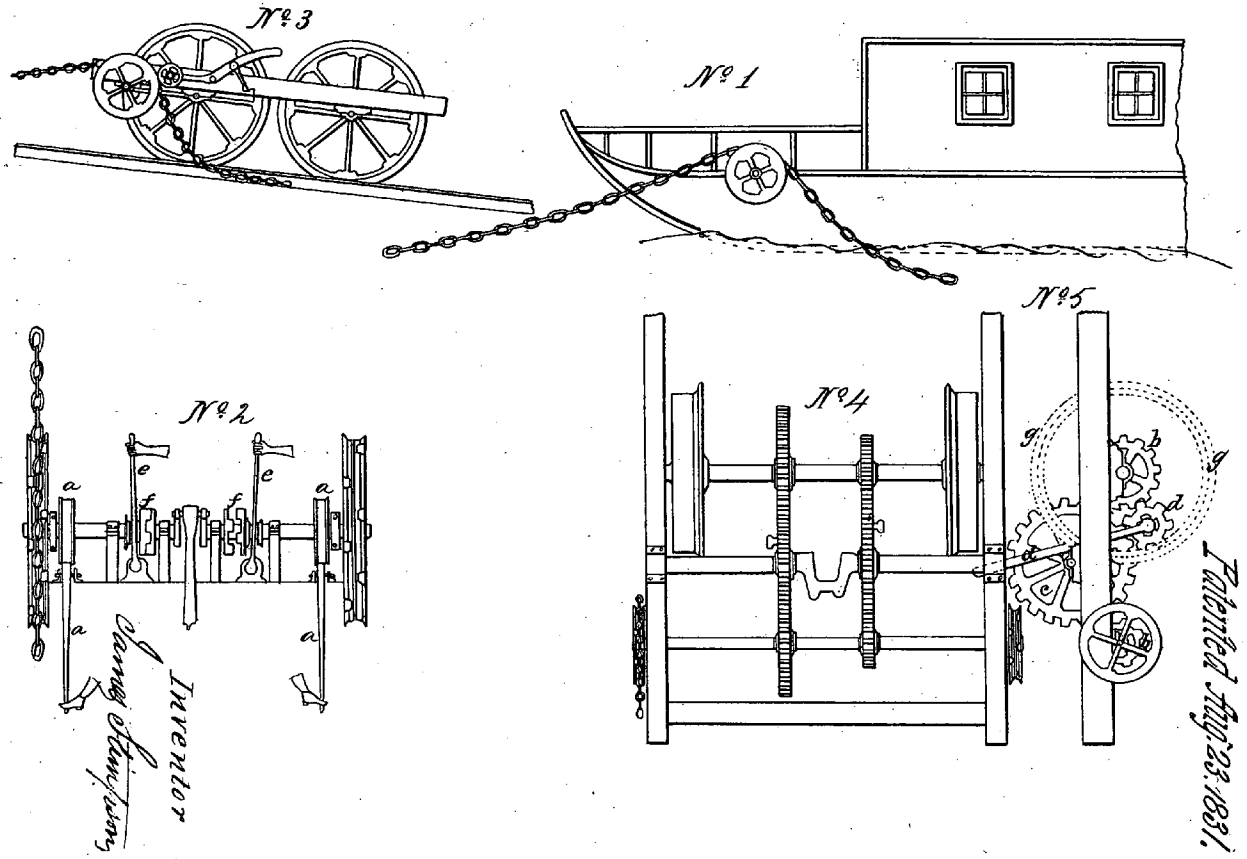
N. PETERS, PHOTO-LITHOGRAPHER, WASHINGTON, D. C.

United States Patent
Patent No.: X6717
J. Stimpson,
R. R. Rails,
Patented Aug. 23, 1831.
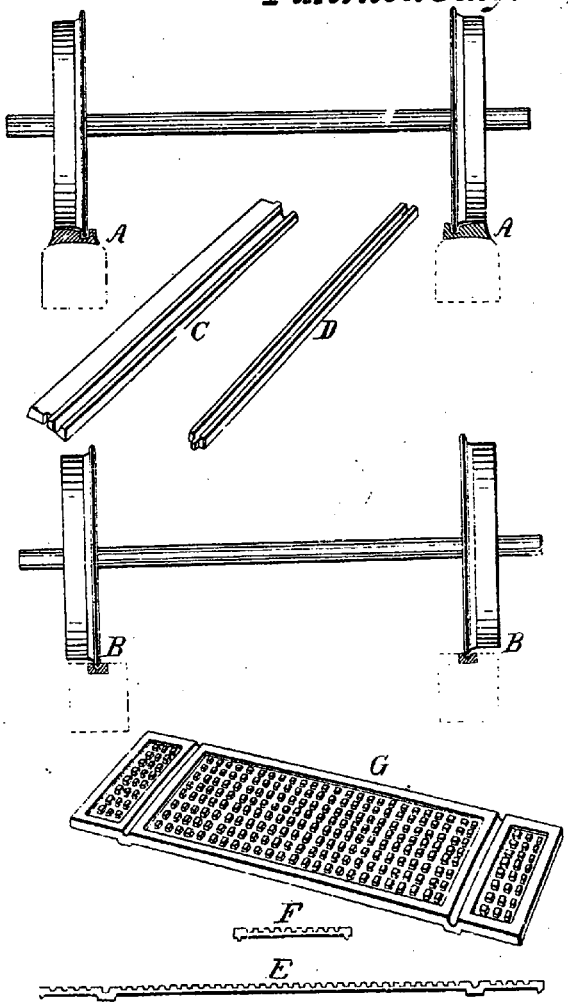

United States Patent
Patent No.: X6717
NO PRINTED SPECIFICATIONS AVAILABLE
J. Stimpson.
Railroad Switch.
Patented Aug. 23, 1831.
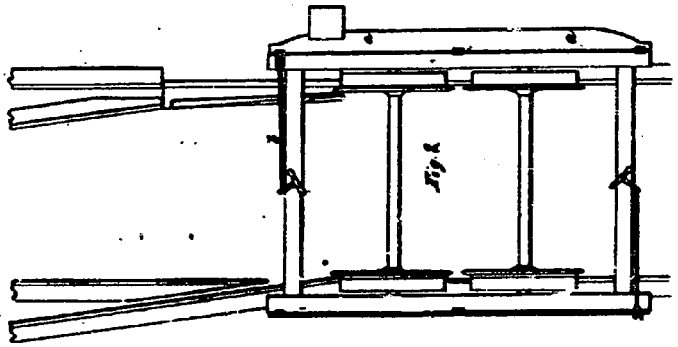
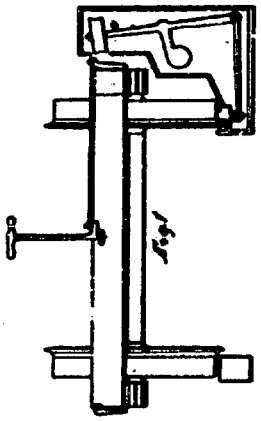
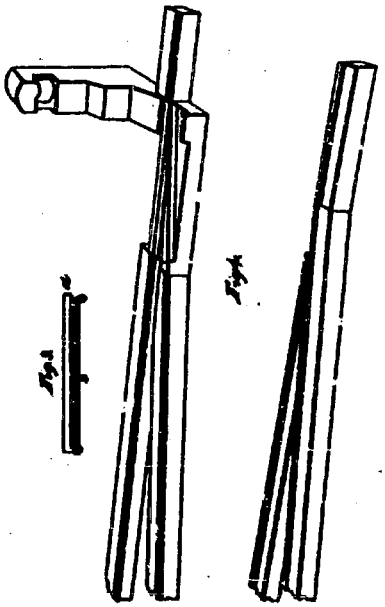
Witnesses.
H. H. Walsh
Inventor.
James Stimpson
THE GRAPHIC CO. PHOTO-LITH. 39 & 41 PARK PLACE, N.Y.